US008899457B1

(12) United States Patent
Maus

(10) Patent No.: US 8,899,457 B1
(45) Date of Patent: Dec. 2, 2014

(54) DETACHABLE ELECTRONIC DEVICE HOLDER

(76) Inventor: Daryl Donavon Maus, Groveland, IL (US)

( * ) Notice: Subject to any disclaimer, the term of this patent is extended or adjusted under 35 U.S.C. 154(b) by 225 days.

(21) Appl. No.: 13/570,674

(22) Filed: Aug. 9, 2012

Related U.S. Application Data

(60) Provisional application No. 61/522,095, filed on Aug. 10, 2011.

(51) Int. Cl.
*A45F 5/02* (2006.01)
*A45F 5/00* (2006.01)

(52) U.S. Cl.
CPC .. *A45F 5/021* (2013.01); *A45F 5/00* (2013.01)
USPC ............................ 224/669; 224/663; 224/668

(58) Field of Classification Search
CPC ... A45F 5/00; A45F 5/021; A45F 2200/0516; A45F 2200/055; Y10S 224/93
USPC .................................................. 224/663–669
See application file for complete search history.

(56) References Cited

U.S. PATENT DOCUMENTS

| 4,200,249 | A | * | 4/1980 | Synstelien et al. | 242/396.5 |
|---|---|---|---|---|---|
| 4,342,140 | A | * | 8/1982 | Lacey | 24/373 |
| 4,834,274 | A | * | 5/1989 | Johnson | 224/240 |
| 5,274,318 | A | * | 12/1993 | Nordberg et al. | 224/242 |
| 6,064,577 | A | * | 5/2000 | Moskowitz et al. | 361/814 |
| 6,109,496 | A | * | 8/2000 | Andrew et al. | 224/664 |
| 7,032,791 | B2 | * | 4/2006 | Stotts | 224/269 |
| 8,374,661 | B2 | * | 2/2013 | Fratti et al. | 455/575.6 |
| 8,517,234 | B2 | * | 8/2013 | Kincaid et al. | 224/198 |
| 2007/0278269 | A1 | * | 12/2007 | Rogers et al. | 224/239 |
| 2009/0026242 | A1 | * | 1/2009 | Kim | 224/666 |
| 2009/0114693 | A1 | * | 5/2009 | Rassias | 224/663 |

* cited by examiner

*Primary Examiner* — Brian D Nash
(74) *Attorney, Agent, or Firm* — Bruce Lev

(57) ABSTRACT

A smart phone holder assembly comprising a holster and a protective phone case. The holster includes two latch assemblies adapted to releasably engage with respective engagement members on the protective phone case thereby securely attaching and easily releasing the protective phone case from the holster. It is possible for the user to quickly, easily and securely engage and disengage the phone in its protective cover from the holster.

17 Claims, 4 Drawing Sheets

US 8,899,457 B1

DETACHABLE ELECTRONIC DEVICE HOLDER

BACKGROUND OF THE INVENTION

The invention relates generally to electronic device portability, and relates more particularly to the handling, transport, storage, and protection of portable electronic devices.

Wireless phone users are increasingly using smart phones rather than cell phones. Because of this they are increasingly accessing and handling their smart phones. Smart phones are larger and more valuable than cell phones and require different means for handling, transport, storage and protection. While it is common for a cell phone user to store their phone in a pocket or purse a smart phone is much more accessible and comfortable to the user when the device is stored in an external holder that is commonly attached at the user's waist or the outside of a purse. The external holsters that are currently available do not offer an optimal combination of security and accessibility and so are not widely used. Most are not easily operated with one hand and require re-gripping the phone for use after it is removed from the holster thereby increasing the likelihood the phone will be dropped while accessing it and handling it.

Smart phone users are increasingly choosing protective cases based on fashion and art. These protective cases with custom graphics display the user's personal ideology and make a fashion statement. When their phones are stored in the pockets, purses and most holsters these covers are concealed and not displayed. The current invention uniquely addresses these needs and problems.

BRIEF SUMMARY OF THE INVENTION

The invention utilizes two spring-loaded latches on a holster that engage mating features in a protective phone case to securely attach the case to the holster. The geometry of the case and latches uniquely interact to require a combination of sliding and pivoting motions to release the protective case from the holster, thereby enabling the invention to efficiently, effectively, and uniquely provide fast and reliable one-handed access to a smart phone. The user is able to grasp the protective case as they would hold it while using the phone and release it from the holster with an intuitive pulling and rotating motion. The protective case can be easily reinserted into the holster utilizing almost any linear and rotary motion. The positioning of the protective case in the holster allows the user to securely display their smart phone case on their body or their fashion accessories while improving and simplifying the user's handling of the phone and thereby reduce the likelihood of dropping the phone.

BRIEF DESCRIPTION OF THE SEVERAL VIEWS OF THE DRAWINGS

The invention will be better understood from a reading of the following detailed description, taken in conjunction with the accompanying figures in the drawing in which.

DETAILED DESCRIPTION OF THE INVENTION

Figure 1:
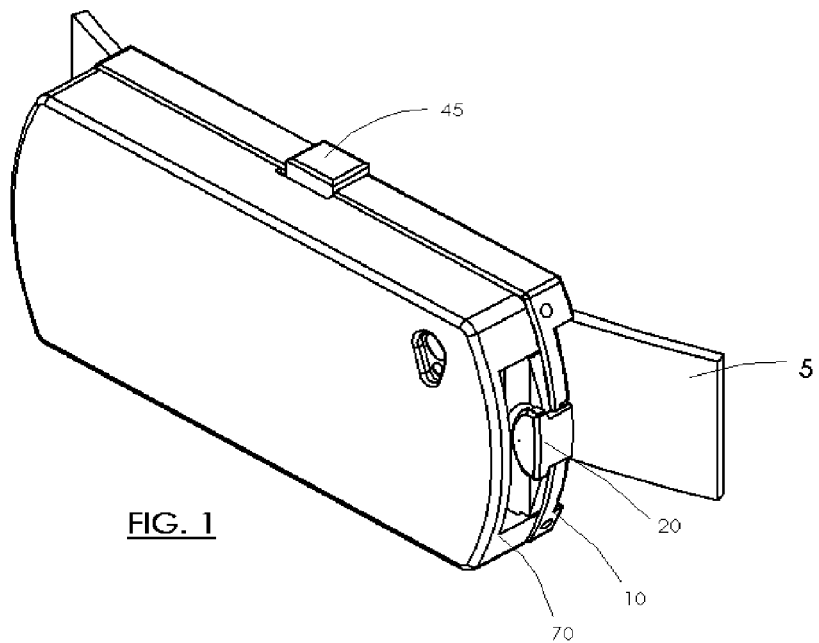
FIG. 1 is a front perspective view of an embodiment the invention attached to a user's belt.
Figure 2:
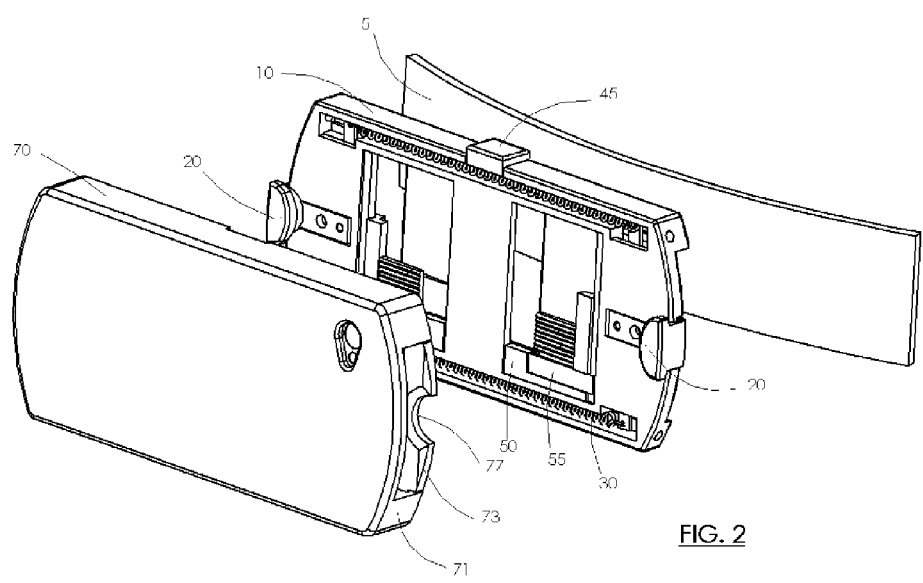
FIG. 2. is a front perspective view of an embodiment the invention with the protective case member separated from the holster member.

With reference to FIG. 1-4, a smart phone holder assembly including a holster member 10 that may be attached to a belt 5, purse, brief case, clutch or any other personal item of the user that allows the user to securely attach and remove a detachable case member 70 containing a smart phone 80.

The holster 10 of the smart phone holder assembly includes two latch assemblies 20 that interlock with mechanical engagement members 77 of the case member 70. These latch assemblies 20 are comprised of a post 21, a guide 22, a slide 23, a lever 24, a screw 25 that attaches the guide, slide, and lever to the post, and a screw 26 to secure the lever and slide to the guide. Two springs 30 pull the latches inward toward the center of the holster. The latch assemblies 20 reside in a frame 40, with incorporates features that capture, guide and limit the motion of the latch assemblies.

The invention may be attached to any item of the user by any means including but not limited to screws, bolts, magnets, clips or other attachment means. An embodiment of the invention adapted for use with a belt or strap is shown. A clamping belt clip 50 slides along ribs 41 in the frame 40 and clamps onto a user's belt, waist band, purse strap, seat belt, or other feature. The belt clip 50 and belt clip spring 55 interlock reacting against each other thereby clamping onto the ribs 41 of the frame 40. To attach the holster to the user; with the belt latch in the open position, the holster is slid onto the user's belt 5, waist band, strap or other feature. The belt clips 42 are positioned on the inside of the belt or waistband. With the holder placed on top of the belt, the user pulls up on the belt latch thereby capturing and locking the user's belt or other feature in the holder.

To release the holster on the belt, the user pushes inward toward the body on the finger pads 51 of the belt latch thereby disengaging the ratcheting teeth 52 from matching interlocking teeth 43 on the holder ribs, thereby allowing the user to return the belt latch the open position.

The case member 70 may be constructed in one, two, three or more parts. An embodiment of the invention adapted for use with a two part case member is shown. The case member 70 of the smart phone assembly includes a lid 71, shock isolating cushions 72, and a base 73 with engagement members 77 on each end that interlock with the posts 21 of the latches 20 of the holster 10. Together the lid, the cushions, and base provide a protective enclosure for a phone 80 and are secured together by screws or interlocking features molded into the lid 75 and base 76 that allow the parts to easily snap together. Additionally, a further embodiment of the cover assembly could include gaskets and operable end doors 74 that would fully seal the case thereby protecting the phone from moisture, dust or other contaminants.

An overhanging cap 29 of the post 21 engages the engagement members 77 of the case member 70 thereby restraining the case member against the front surface of the frame 40. The latch assemblies 20 of the holster member 10 and the engagement members 77 of the case member 20 interact in a unique way to secure the case member containing the smart phone 80 to the holster member. The case member cannot be separated from the holster member by the typical forces encountered from bumping objects, falling or moving. When the user desires to access their phone, the case member is easily removed from the holster member with a natural combination of sliding and rotating motion provided by the user. For extreme conditions such as snowboarding, mountain biking, or when intentional theft is a concern an additional safety 45 effectively locks out the linear motion required for all forms of release. The protective case is easily inserted into the holster with natural intuitive motions. Utilizing the insertion motion of the user, the geometry of the curved ends 78 of the engagement members 77 of the case member 70 interact with the convex feature 28 of the post 21 to open the latch assembly 20 and guide the case member to the latched position in the holster member.

The case member 70 is secured to the holster member 10 with the phone screen facing the user and thereby protected from damage. While in the holster member, the back and all four sides of the case member are visible and accessible, this allows the user to grasp the phone in the case member, with their entire hand including the palm and all fingers, just as they would hold it while talking or viewing the screen. The ability to grasp the phone firmly with one hand as it is used, eliminates the need to re-grasp the phone for use after removing it from the holster member, thereby improving efficiency while reducing the likelihood of dropping the phone.

Figure 3:
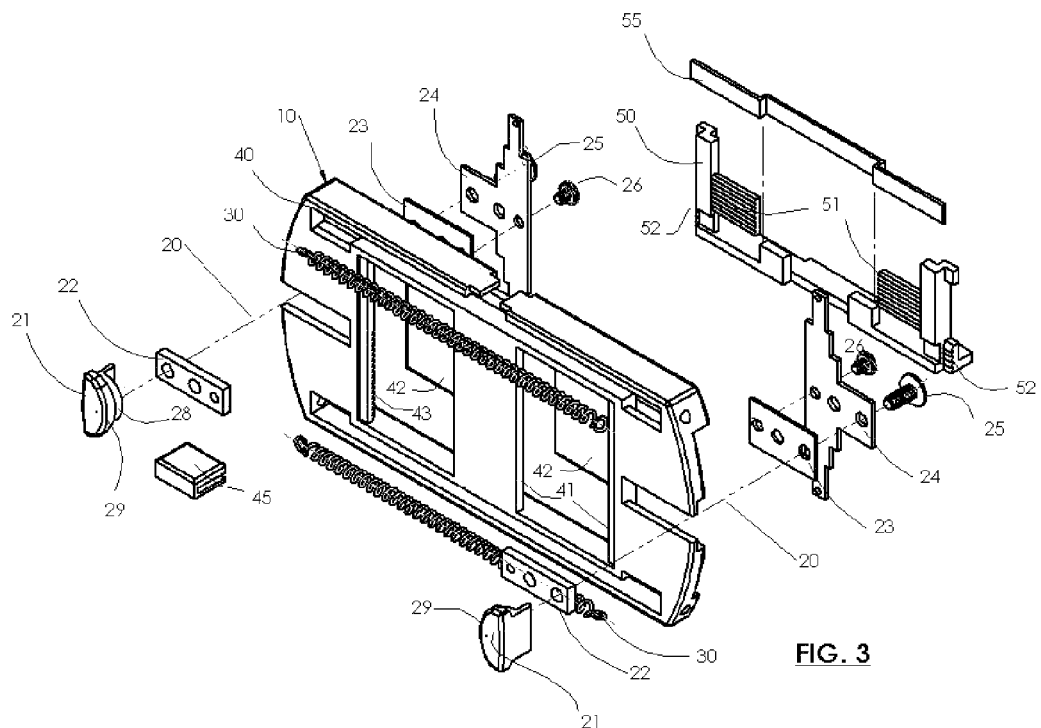
FIG. 3 is a front perspective exploded view of the holster member shown in FIG. 2.
Figure 4:
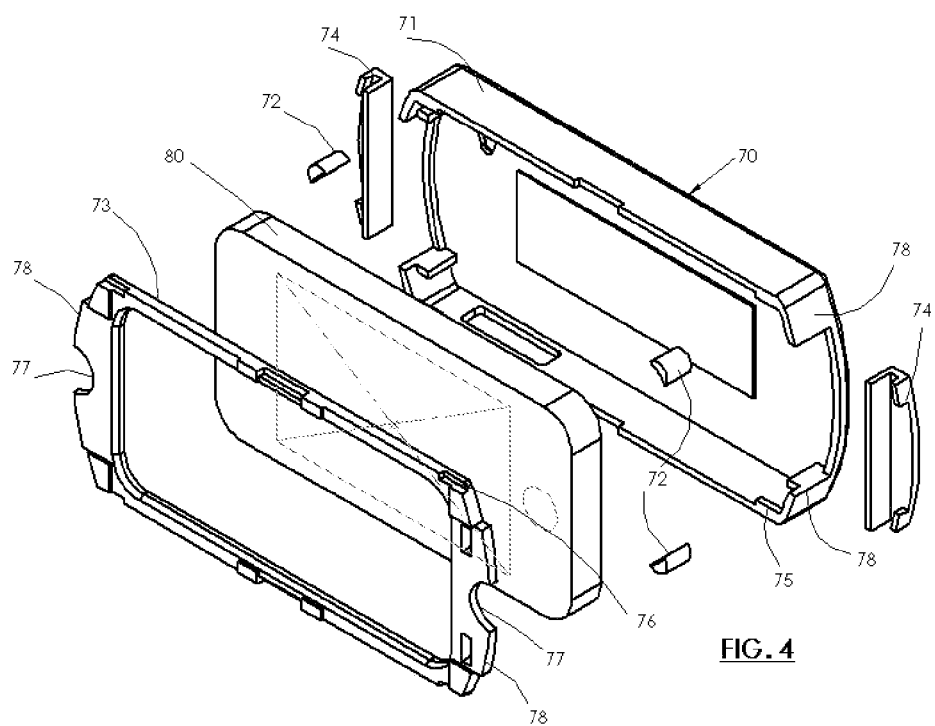
FIG. 4 is a rear perspective exploded view of the case member shown in FIG. 2.
Figure 5:
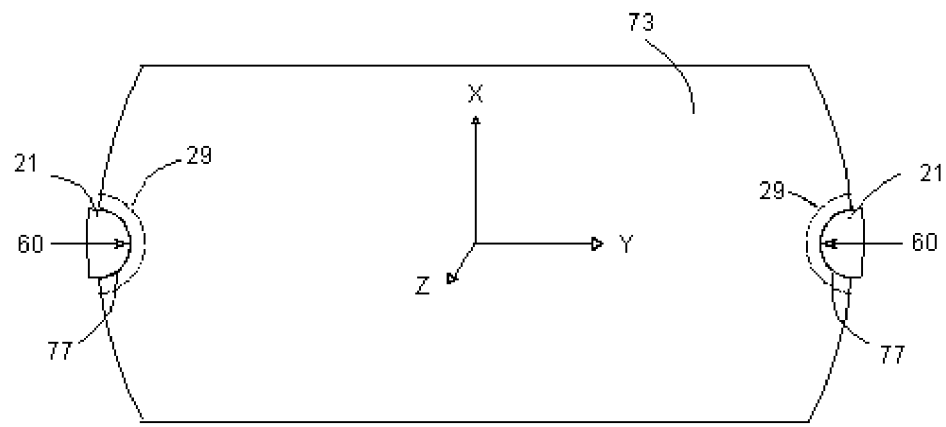
FIG. 5 is a kinematic schematic of an embodiment of the invention in the latched position.
Figure 6:
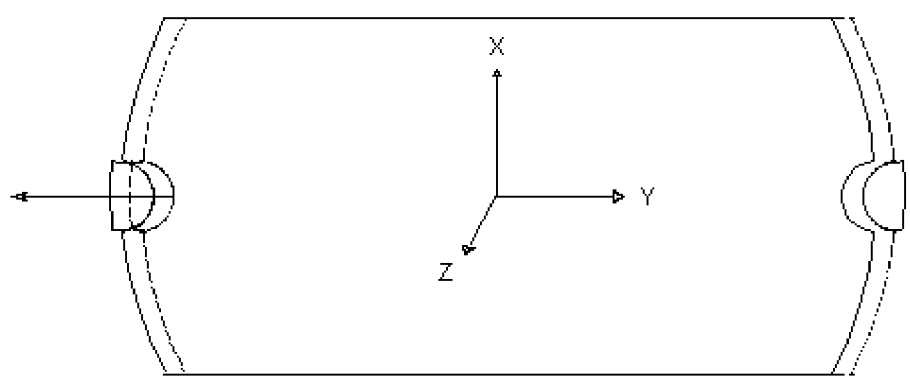
FIG. 6 is a kinematic schematic of an embodiment of the invention in the first step of unlatching.
Figure 7:
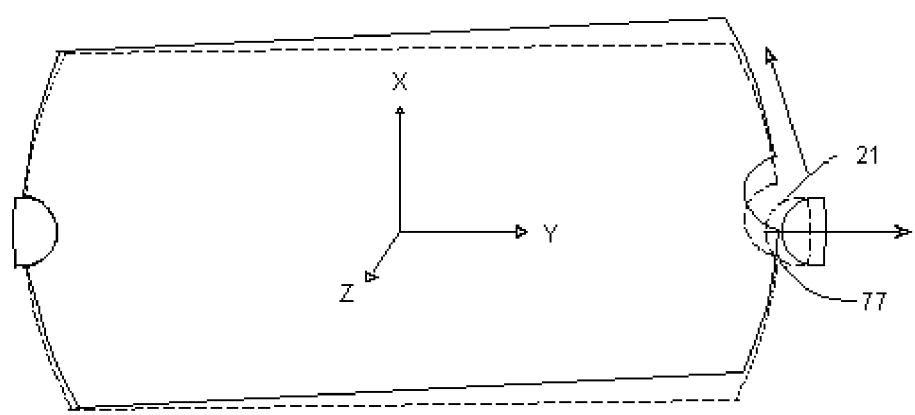
FIG. 7 is a kinematic schematic of an embodiment of the invention in the second step of unlatching.

With reference to FIGS. 5-7, the movements required to release the case member 70 from the holster member 10 and the kinematics of the invention are illustrated. Referring to FIGS. 5, 3, & 4 the forces 60 produced by the springs 30 acting on the levers 24, connected to the posts 21 press inward, in opposition to each other acting on the engagement members 77 of the case member 70. An overhanging cap 29 on the top of the post 21 overhangs the engagement member thereby securing the case member 20 to the holster member 10 preventing any forces normal to the holster member from releasing the case member. For purposes of illustrating the kinematics in FIGS. 6-7 the overhanging cap has been omitted.

The kinematics created by the geometry of the convex post 21 and the mating concave feature of the engagement member 77, the spring force 60, and their relative arrangement, resists any forces applied to the case member 20 and constrains any motion in the Y and Z orthogonal axes, as well as any rotary motion about the X, Y and Z axis. As shown in FIG. 6, a limited motion is allowed in the X axis. A force creating this motion by itself will not release the protective case as it is still constrained by the post 21 acting on the engagement member on the opposing side of the case member 70. When this external force is released the force from the springs 30 acting on the posts 21 will return the case member 70 to its normal position.

Referring to FIG. 7, while being securely held, the unique kinematics of the invention allows the user with a natural two staged sequenced motion to easily remove the phone. To release the case member 20 from the holster member 10 the user grips the case member as they would naturally hold it, slides the case member in the X axis to the limit of its motion, and then rotates the case member about the post 21 the engagement member 77 is being forced into. When the case member is at the limit of its motion in the X axis, the motion of the opposing post is limited enabling the opposing engagement member 77 and the opposing post 21 to separate. When an engagement member is held against a post and then rotated, the opposing engagement member will act on the curved surface 28 of the opposing post thereby translating the user's rotational force to linear force acting outward in the X axis on the posts and thereby opening the opposing latch assembly 20. Continuing this rotary motion until the engagement feature is clear of the overhanging cap 29 of the post will release the case member from the holster member. The rotary motion may be up or down and the sliding motion may be forward or back thereby allowing the phone to be accessed by either hand with the smart phone holder assembly in any position on the user.

Reversing this procedure, and other simple motions such as a linear motion in the Y axis or a rotary motion about the Z axis, will insert and secure the case member 70 in the holster member 20. This allows the user to maintain their natural grip on the phone that they used when talking while inserting the case member in the holster member.

While the preferred embodiment uses a convex circular profile on the post 21 and a concave circular cutout in the engagement member 77 on the case member 70 other shapes can produce a similar kinematic operation. The relevant features are contacting parallel surfaces in the latched position and contacting ramped surfaces in the partially unlatched position.

Figure 8:
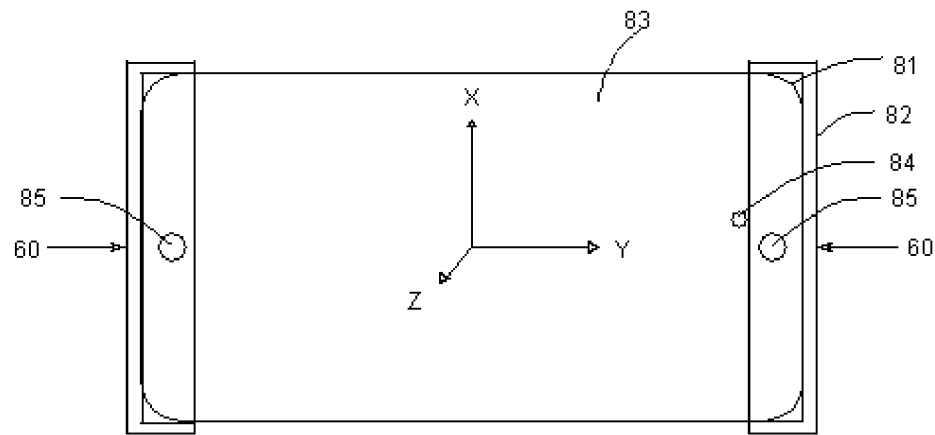
FIG. 8 is a kinematic schematic of an embodiment of the invention in the latched position.
Figure 9:
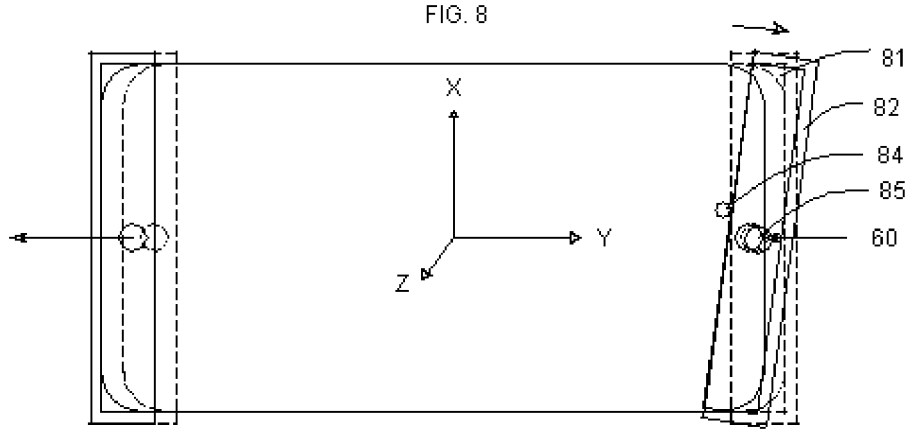
FIG. 9 is a kinematic schematic of an embodiment of the invention in the first step of unlatching.
Figure 10:
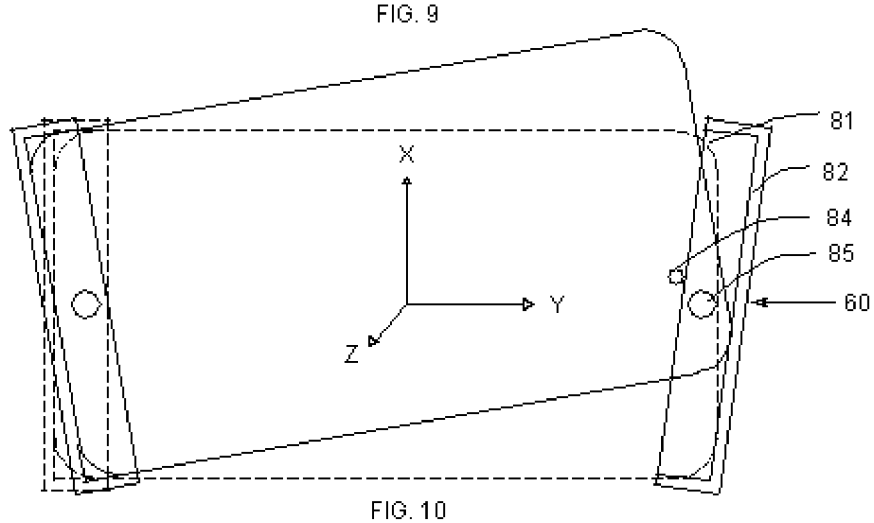
FIG. 10 is a kinematic schematic of an embodiment of the invention in the second step of unlatching.

FIGS. 8-10 illustrate another embodiment of the invention in which the respective convex and concave features of the post 21 and engagement feature 77 are swapped for convex corners 81 of the case member 83 and a concave cup 82 that receives the case member. Referring to FIGS. 8 & 3, the forces 60 produced by the springs 30 acting on the levers 24, connected to the cups 82 press inward, in opposition to each other acting on the corners 81 of the case member.

As in the previous embodiment, the kinematics created by the geometry of these parts and their arrangement, resists any forces applied to the case member 83 in the latched position and constrains any motion in the Y and Z orthogonal axes, as well as any rotary motion about the X, Y and Z axis. As shown in FIG. 9, a limited motion is allowed in the X axis. A force creating this motion by itself will not release the protective case as it is still constrained by the cup 82 acting on the far side of the case member. If this force is released the force from the springs 26 acting on the cups 82 will return the protective case to its normal position. In this embodiment, the cup 82 is free to pivot about its pivot member 85 which is attached to the lever 24. Under the force of the spring 30 acting on lever 24 the cup will move inward striking an off axis post 84 causing the cup to rotate.

Referring to FIG. 10, when the case member 83 is at the limit of its motion in the X axis and rotated about pivot member 85 the engagement feature 81 will act on the surface of the opposing cup 82 thereby translating the rotational force to a linear force acting outward in the X axis on the cup and thereby opening the latch. Continuing this rotary motion until the case member 83 is clear of the cup will release the case member from the holster member 10.

The invention claimed is:

1. A holder assembly comprising a holster member and a case member releasably attachable to said holster member for securely and releasably holding a phone to a belt, purse strap, or other item of a user; said holster member including two biased latch assemblies adapted to releasably engage with respective members of said case member; and said case member including two engagement members adapted to securely and removably engage with said respective latch assemblies of said holster member, such that when said engagement members engage with said latch assemblies said phone can be held securely and removably to said belt, purse strap, or other item of a user; and wherein said biased latch assemblies are formed as linearly displaced biased latch assemblies, and wherein said latch assemblies are located on opposite sides of said holster member and are biased in opposite directions and inwardly of said holster member, and wherein when said case member is being attached to said holster member, one engagement member is engaged with one respective latch assembly first, then the second member is engaged with the other respective latch assembly secondly, and when said case member is being removed from said holster member, one engagement member is disengaged from one respective latch assembly first, then the second member is disengaged with the other respective latch assembly secondly.

2. The holder assembly of claim 1, wherein said linearly displaced biased latch assemblies are spring biased.

3. The holder assembly of claim 2, wherein each of said linearly displaced spring biased latch assemblies further include a guide member attached to a respective spring member, a slide member attached to said guide member, and a post member attached to said guide member, wherein each said post member is adapted to releasably engage with a respective engagement member of said case member.

4. The holder assembly of claim 3, wherein each said engagement member has a curved engagement surface, and each said post member has a curved surface adapted to slidably engage with each respective curved engagement surface, such that the motions required for detachment between said case member and said holster member are reduced to one respective linear motion followed by one respective angular motion.

5. The holder assembly of claim 1, further including at least one safety member adapted to connect between said holster member and said case member that is adapted to block the linear movement between them required for detachment, to thereby resist theft and to ensure that said case member does not become accidentally disengaged and fall away from said holster member.

6. The holder assembly of claim 1, wherein each of said two biased latch assemblies include an inwardly facing convex post with an overhanging cap and wherein said latch assemblies are located on opposite sides of said holster member and are biased in opposite directions and inwardly of said holster member; and wherein said engagement members of said case member include concave shaped engagement features adapted to fit around the respective convex posts and under the overhanging cap of said post, such that when said case member is being attached to said holster member, one engagement member is engaged with one respective latch assembly first, then the second engagement member is engaged with the other respective latch assembly secondly, and when said case member is being removed from said holster member, one engagement member is disengaged from one respective latch assembly first, then the second member is disengaged with the other respective latch assembly secondly.

7. The holder assembly of claim 6, wherein each said case member includes curved ends, such that when the case member is engaged with a post and rotated about such post the curved ends of the case member displace one or both convex posts linearly and such that when the case member is placed between the two convex posts on an axis perpendicular to the axis connecting the posts the curved ends of the case member linearly displace both convex posts.

8. The holder assembly of claim 7, wherein said case member further includes concave engagement features located on the curved ends of the case member that allow the displaced convex posts of the holster member to return to their latched position thereby securing the case member to the holster member.

9. The holder assembly of claim 8 wherein said latch assemblies are limited in travel such that no single linear or rotary motion of the case member will release the case member but such that when one latch assembly is fully displaced linearly and the case is then rotated about the post of said latch assembly the outside corner of the opposing engagement feature linearly displaces the opposing latch assembly thereby releasing the case member from the holster member.

10. The holder assembly of claim 9, further including at least one safety member adapted to connect between said holster member and said case member that is adapted to block the linear movement between them required for detachment, to thereby resist theft and to ensure that said case member does not become accidentally disengaged and fall away from said holster member.

11. The holder assembly of claim 1, wherein each of said two biased latch assemblies include an inwardly facing concave cup, and wherein said latch assemblies are located on opposite sides of said holster member and are biased in opposite directions and inwardly of said holster member; and wherein said engagement members of said case member include convex shaped corners adapted to slide and fit into respective concave cups, such that when said case member is being attached to said holster member, one engagement member is engaged with one respective latch assembly first, then the second member is engaged with the other respective latch assembly secondly, and when said case member is being removed from said holster member, one engagement member is disengaged from one respective latch assembly first, then the second member is disengaged with the other respective latch assembly secondly.

12. The holder assembly of claim 11, wherein each said concave cup includes a pivot member, such that each said concave cup can be displaced linearly and pivotally.

13. The holder assembly of claim 12, wherein said holster further includes an off-axis post that is adapted to contact one of said concave cups when said latch assembly of said one concave cup is biased inwardly, thereby facilitating the placement and removal of said case member within said holster member.

14. The combination of a phone and a phone holder assembly; said phone holder assembly comprising a holster member and a case member releasably attachable to said holster member for securely and releasably holding said phone to a belt, purse strap, or other item of a user; said holster member including two biased latch assemblies adapted to releasably engage with respective members of said case member; and said case member adapted to releasably hold said phone therebetween, and two engagement members adapted to securely and removably engage with said respective latch assemblies of said holster member, such that when said engagement members engage with said latch assemblies said phone can be held securely and removably to said belt, purse strap, or other item of a user; and wherein said biased latch assemblies are formed as linearly displaced biased latch assemblies, and wherein said latch assemblies are located on opposite sides of said holster member and are biased in opposite directions and inwardly of said holster member, and wherein when said case member is being attached to said holster member, one engagement member is engaged with one respective latch assembly first, then the second member is engaged with the other respective latch assembly secondly, and when said case member is being removed from said holster member, one engagement member is disengaged from one respective latch assembly first, then the second member is disengaged with the other respective latch assembly secondly.

15. The phone holder assembly of claim 14, wherein said linearly displaced biased latch assemblies are spring biased.

16. The phone holder assembly of claim 15, wherein each of said two biased latch assemblies include an inwardly facing convex post with an overhanging cap and wherein said latch assemblies are located on opposite sides of said holster member and are biased in opposite directions and inwardly of said holster member; and wherein said engagement members of said case member include concave shaped engagement features adapted to fit around the respective convex posts and under the overhanging cap of said cap, such that when said case member is being attached to said holster member, one engagement member is engaged with one respective latch assembly first, then the second engagement member is engaged with the other respective latch assembly secondly, and when said case member is being removed from said holster member, one engagement member is disengaged from one respective latch assembly first, then the second member is disengaged with the other respective latch assembly secondly.

17. The phone holder assembly of claim 15, wherein each of said two biased latch assemblies include an inwardly facing concave cup, and wherein said latch assemblies are located on opposite sides of said holster member and are biased in opposite directions and inwardly of said holster member; and wherein said engagement members of said case member include convex shaped corners adapted to slide and fit into respective concave cups, such that when said case member is being attached to said holster member, one engagement member is engaged with one respective latch assembly first, then the second member is engaged with the other respective latch assembly secondly, and when said case member is being removed from said holster member, one engagement member is disengaged from one respective latch assembly first, then the second member is disengaged with the other respective latch assembly secondly.

\* \* \* \* \*